Nov. 26, 1929.
R. J. STEVENSON ET AL
SMOKER'S STAND
Original Filed Nov. 10, 1924
Re. 17,500
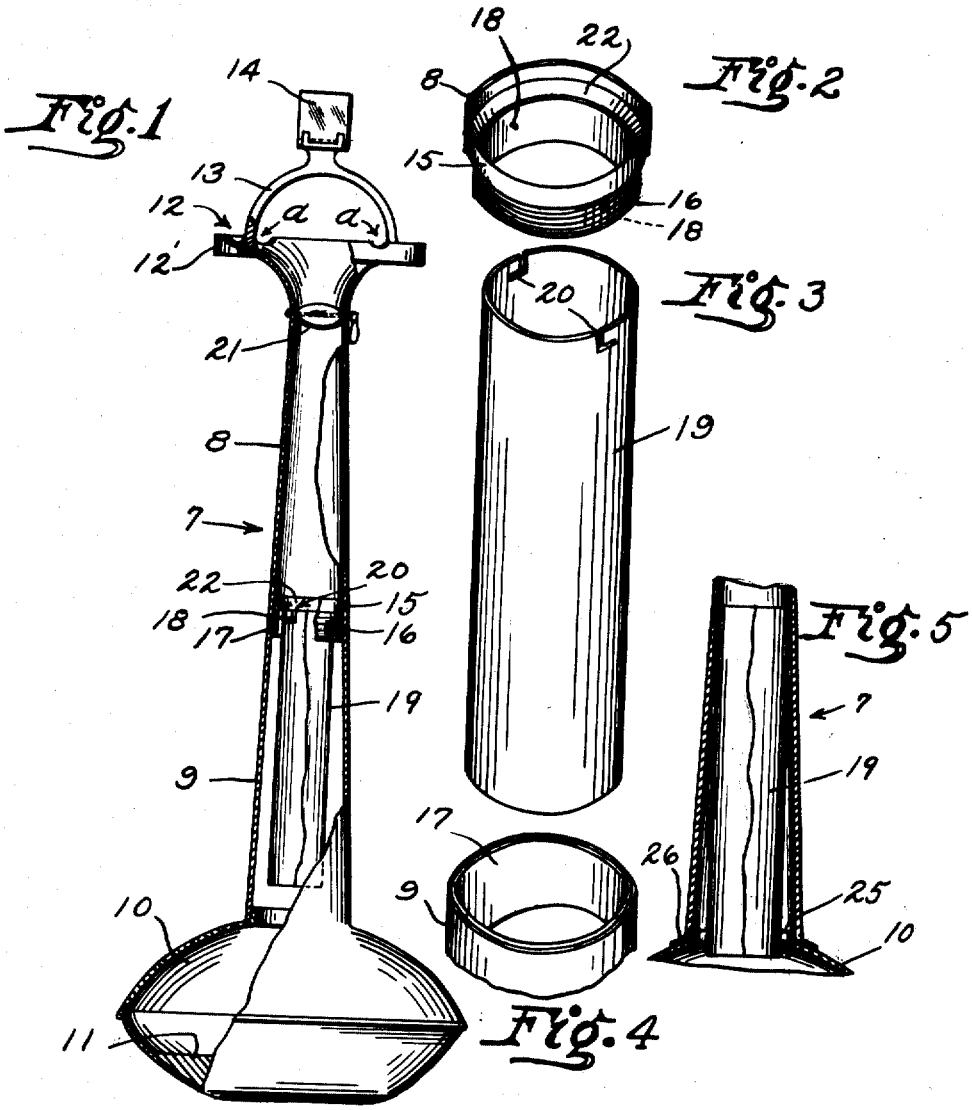
INVENTORS,
Robert J. Stevenson,
Lura B. Colby, And
Administratrix of the estate of
Hayward T. Colby, deceased;
By Raymond Ives Blakeslee,
ATTORNEY.

Reissued Nov. 26, 1929 Re. 17,500

UNITED STATES PATENT OFFICE

ROBERT J. STEVENSON, OF LOS ANGELES, AND HAYWARD T. COLBY, DECEASED, LATE OF LOS ANGELES, CALIFORNIA, BY LURA B. COLBY, ADMINISTRATRIX, OF LOS ANGELES, CALIFORNIA, ASSIGNORS, BY MESNE ASSIGNMENTS, TO SMOKADOR MANUFACTURING CO., INC., OF BLOOMFIELD, NEW JERSEY, A CORPORATION OF NEW JERSEY

SMOKER'S STAND

Original No. 1,660,771, dated February 28, 1928, Serial No. 748,946, filed November 10, 1924. Application for reissue filed June 8, 1929. Serial No. 369,357.

This invention relates to a smoker's stand and particularly pertains to that type of smoker's stand embodying a tall hollow standard by which the usual smoking accessories are supported and into which refuse may be deposited.

An object of the invention is to provide a smoker's stand of the above character which is so constructed that it may be readily cleaned and kept sanitary.

Another object is to provide a smoker's stand embodying a refuse receptacle detachably mounted interiorly of a tall tubular standard at a point remote from the upper end thereof and the structure so formed that ready access may be had to the receptacle and whereby it may be easily and quickly removed and replaced.

Another object is to provide a smoker's stand embodying a base carrying a demountable tubular standard the upper end of which is open to permit the deposit of refuse therein, and including a removable refuse receptacle adapted to be located interiorly of the standard and mounted and arranged so that it may be readily removed and replaced on demounting the standard.

A further object is to provide a construction whereby the removable refuse receptacle is so mounted within the tubular standard that the margin of the receptacle will closely contact the inner surface of the standard whereby refuse materials passing down the interior of the standard will be directed wholly into the receptacle and thus prevent the accumulation of refuse in the stand other than in the receptacle.

With the foregoing objects in view, together with such other objects and advantages as may subsequently appear, the invention resides in the parts and in the combination, construction and arrangement of parts hereinafter described and claimed and illustrated by the way of example in the accompanying drawing, in which:—

Figure 1 is a view partly in section and partly in elevation of a smoker's stand embodying one form of the invention.

Figure 2 is a detail in perspective showing the collar attachment for supporting the refuse receiving receptacle form of the invention shown in Figures 1 and 3.

Figure 3 is a perspective view of the refuse receiving receptacle shown in Figure 1.

Figure 4 is a detail in perspective showing the threaded neck of the lower part of the standard as shown in Figure 1.

Figure 5 is a vertical cross-sectional view showing a modification of the invention.

Referring to the drawings more specifically, 10 indicates a base fitted with a suitable weight 11 to stabilize the stand and prevent accidental overturning thereof in event of its being tipped; the bottom face of the base being rounded so that it may rock on a surface on which it is supported. Fixed on the upper portion of the base is an annular member 9 which may project upwardly any suitable distance from the base; it being shown in Fig. 1 as terminating a considerable distance above the base and shown in Figure 5 as terminating in close proximity to the base. Detachably connected to the member 9 is an open ended tube 8 preferably of circular cross section, and preferably formed of sheet metal and which member 8 constitutes a tubular standard 7 that is demountable with relation to the base 10.

The upper end of the demountable tube is formed with an enlarged head 12 which serves as a refuse receiver and is fitted with a handle 13 fitted with a holder 14 adapted to receive a box of matches, the head being formed with a rim 12′ having top recesses *a* for supporting cigars and the like.

In the construction shown in Figures 1 to 4 inclusive, a collar member 15 is rigidly secured interiorly of the lower end of the tube 8, which collar is externally threaded as indicated at 16 in Figure 2 to effect screw engagement with internal threads 17 on the annular member 9 carried by the base. Diametrically opposed studs 18 are carried on the inner periphery of the collar 15 and projecting inwardly therefrom afford a support for a cylindrical refuse receptacle 19; the studs being adapted to be detachably engaged in bayonet slots 20 formed in the upper margin of said receptacle, whereby the receptacle may be supported within the tube 8 in the lower portion thereof and positioned so that it may be readily removed and replaced on detaching the tube 8.

The collar member 15 is provided with an internal annular ledge 22 which extends over the upper edge of the receptacle and serves to direct refuse passing down the tube 8 into the receptacle 19 carried by the latter and also serves to prevent refuse from passing between the receptacle 19 and the member 9.

A damper 21 of the usual form may be fitted in the neck of the upper portion of the tube if desired so as to close the passage leading to the receptacle 19 and thereby trap fumes interiorly of the standard.

From the foregoing description it will be readily seen that when it is desired to empty the refuse receptacle 19, it is only necessary to unscrew the tube 8 from the member 9, whereupon on removing the tube the receptacle 19 will be lifted therewith and can be readily detached from the collar member 15, and thereafter emptied and replaced.

In the form of the invention shown in Figure 5 the receptacle is frictionally engaged in the tube 8, it being inserted in the enlarged lower end thereof and caused to effect wedge and frictional engagement with the inner surface of the tube. For this purpose the receptacle is formed of such length and diameter that when it is inserted in the lower end of the tube the margin of the open upper end of the receptacle will contact the inner periphery of the tube at such a point relative to the lower end of the tube that when the upper end of the receptacle is engaged with the tube, the lower end of the receptacle will project such distance below the lower end of the tube that it may be readily grasped in effecting its removal and replacement.

In the construction shown in Figure 5 the annular member 9 is formed with external threads 25 and the tube 8 is formed with an internally threaded band 26 for effecting screw engagement between the tube 8 and the member 9.

In the operation of the invention the débris to be collected, ordinarily comprising the refuse from cigars, cigarettes, pipes, matches, etc., is delivered into the open upper end of the tube 8 and is thence directed downwardly through the standard into the receptacle where it is collected, and when it is desired to empty the receptacle the tube is disconnected at its juncture with the member 9 on the base portion of the stand whereupon the receptacle may be removed and replaced as before described; it being rendered accessible on demounting the tube.

By the constructions and arrangements herein set forth the refuse receptacle will be securely and completely encased within the standard 7 in a manner that will inhibit the contents thereof being spilled, and the receptacle is engaged with the standard in such manner that no space will be formed around the upper end of the receptacle through which refuse may pass; the joint between the receptacle and the standard being such that all the débris passing down the standard will be directed into the receptacle and without passing into the base.

As many changes could be made in the above described detailed construction, and many different embodiments of this invention could be made without departing from the spirit thereof, it is intended that all matter contained in the above description or shown in the accompanying drawings shall be interpreted as illustrative and not in a limiting sense.

We claim:—

1. In a smoker's stand, a base, a demountable tube having a screw connection with relation to said base, and a refuse receptacle detachably mounted interiorly of said tube which may be removed and replaced on demounting said tube.

2. In a smoker's stand, a base, an open ended tapered tube having screw threads at its enlarged lower end a threaded annulus carried by said base for engagement with said tube, a removable refuse receptacle disposed interiorly of the lower portion of said tube with the margin of the receptacle slidably contacting the inner surface of said tube in frictional engagement therewith.

3. In a smoker's stand, a tublar member, means to support said member in an upright position, and a refuse receptacle housed within said tubular member and removable from the lower end thereof.

4. In a smoker's stand, a tubular member, a base therefor, a detachable connection between said base and tubular member, and a refuse receptacle housed within said tubular member and removable therefrom.

5. In a smoker's stand, a tubular member, a base detachably attached to the lower end of said tubular member adapted for rocking contact with a supporting surface, and a refuse receptacle detachably attached to said tubular member and removable therefrom after removal of said tubular member from said base.

6. In a smoker's stand, a tubular member, a base with which said tubular member is detachably connected, and a refuse receptacle housed within said tubular member and removable from the lower end thereof.

7. In a smoker's stand, a tubular member, a base adapted to support said tubular member in an upright position, detachable connections between said base and tubular member, and a refuse receptacle housed within one of said members and detachably attached to said tubular member.

8. In a smoker's stand, a tubular member, a base having a curved lower surface to support said tubular member in an upright position and to restore said tubular member thereto when tilted therefrom, detachable connections between said base and tubular member, and a refuse receptacle detachably attached at its upper edge to one of said members, so that it is suspended within and enclosed by said base and tubular member.

9. In a smoker's stand, a tubular member, a member detachably attached thereto to support said tubular member in an upright and elevated position, and a refuse receptacle detachably attached to said tubular member and removable therewith when said tubular member is detached from said supporting member.

10. In a smoker's stand, a tubular member, a member to support said tubular member in an upright position, connecting means to detachably connect said members together, a refuse receptacle encased by said members, and connecting means independent of said first mentioned connecting means for detachably connecting said receptacle to one of said members.

11. A receiver for smoker's waste comprising in combination, an elongated, upright, waste-conducting tube having at its upper end an enlarged head adapted to receive waste and lead it into said tube through a waste passage of relatively small diameter compared with the length of said tube, a waste receiving receptacle for receiving waste from the lower end of said tube, means for detachably holding said receptacle to said tube in waste receiving relation to said tube, and means for supporting said receiver with said receptacle off the floor.

12. A receiver for smoker's waste comprising in combination, an elongated, upright, waste-conducting tube having at its upper end an enlarged head adapted to receive waste and lead it into said tube through a waste passage of relatively small diameter compared with the length of said tube, a waste receiving receptacle for receiving waste from the lower end of said tube, means for detachably holding said receptacle in waste receiving relation to the lower end of said tube, said means being adapted for ready disconnection for removal of said receptacle, and means to support said tube and receptacle in vertical position off the floor.

13. A receiver for smoker's waste comprising in combination, an elongated, upright, waste-conducting tube having at its upper end an enlarged head adapted to receive waste and lead it into said tube through a waste receiving passage of relatively small diameter compared with the length of said tube, a waste receiving receptacle, connecting means adjacent the lower end of said tube to detachably connect said receptacle to said tube in close communication with the lower end thereof, and supporting means for said receiver independent of said receptacle to support said receiver with the receptacle off the floor.

14. A receiver for smoker's waste comprising in combination, an elongated, upright, waste-conducting tube having at its upper end an enlarged head adapted to receive waste and lead it into said tube through a waste receiving passage of relatively small diameter compared with the length of said tube, a waste receiving receptacle, connecting means adjacent the lower end of said tube and having portions surrounding the upper end of said receptacle to detachably connect said receptacle to said tube in close communication with the lower end thereof, and supporting means for said receiver with the receptacle off the floor.

In testimony whereof, we have signed our names to this specification at Los Angeles, Calif., this 15th day of May, 1929.

ROBERT J. STEVENSON.
LURA B. COLBY,
*Administratrix of the Estate of Hayward T. Colby, Deceased.*